United States Patent
Carter et al.

(10) Patent No.: US 7,065,351 B2
(45) Date of Patent: Jun. 20, 2006

(54) EVENT-TRIGGERED DATA COLLECTION

(75) Inventors: Stephen Carter, Rancho Santa Re, CA (US); Mark Moeglein, Ashland, OR (US); James D. DeLoach, Jr., Sunnyvale, CA (US); Wyatt T. Riley, King of Prussia, PA (US); Daniel H. Agre, Solana Beach, CA (US); Leonid Sheynblat, Hillsborough, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/634,322

(22) Filed: Aug. 4, 2003

(65) Prior Publication Data

US 2004/0152362 A1   Aug. 5, 2004

Related U.S. Application Data

(60) Provisional application No. 60/444,246, filed on Jan. 30, 2003, provisional application No. 60/463,910, filed on Apr. 17, 2003.

(51) Int. Cl.
*H04Q 17/00*   (2006.01)
(52) U.S. Cl. ................ 455/423; 455/67.11; 455/456.1; 455/436; 455/442; 455/446; 455/404.1
(58) Field of Classification Search ................ 439/66; 455/423, 423.1, 435.1, 436, 442, 446, 456.1, 455/457, 67.11, 12.1, 432.1, 404.1, 418–420
See application file for complete search history.

(56) References Cited

U.S. PATENT DOCUMENTS

| | | | | |
|---|---|---|---|---|
| 5,588,848 A | | 12/1996 | Law et al. .................... 439/83 |
| 5,706,333 A | * | 1/1998 | Grenning et al. ........... 455/423 |
| 5,987,306 A | * | 11/1999 | Nilsen et al. ............ 455/67.11 |
| 6,175,500 B1 | | 1/2001 | Roy ........................... 361/719 |
| 6,466,797 B1 | * | 10/2002 | Frodigh et al. .......... 455/456.1 |
| 6,603,966 B1 | * | 8/2003 | Sheffield ..................... 455/423 |
| 6,754,470 B1 | * | 6/2004 | Hendrickson et al. ... 455/456.1 |
| 2001/0041566 A1 | * | 11/2001 | Xanthos et al. ............. 455/423 |
| 2002/0076951 A1 | | 6/2002 | Roy ............................. 439/65 |
| 2002/0076952 A1 | | 6/2002 | Roy ............................. 439/65 |
| 2002/0076958 A1 | | 6/2002 | Roy et al. ..................... 439/83 |
| 2002/0131255 A1 | | 9/2002 | Roy ........................... 361/772 |
| 2002/0137404 A1 | | 9/2002 | Roy ........................... 439/874 |
| 2003/0083064 A1 | * | 5/2003 | Cooper ....................... 455/432 |
| 2003/0129987 A1 | * | 7/2003 | Tanay et al. ................ 455/450 |
| 2004/0110518 A1 | * | 6/2004 | Swift et al. .............. 455/67.13 |
| 2004/0203727 A1 | * | 10/2004 | Abiri et al. ................. 455/423 |

* cited by examiner

*Primary Examiner*—Joseph Feild
*Assistant Examiner*—Kamran Afshar
(74) *Attorney, Agent, or Firm*—Philip Wadsworth; Charles D. Brown; James D. McFarland

(57) ABSTRACT

A method of obtaining data useful for one or more network applications is described. The method is performed responsive to a triggering event, such as a dropped call, a position fix, or even expiration of a timer. A position estimate for a subscriber station is obtained responsive to the event. A record is then formed associating the position estimate for the subscriber station with an identifier of the triggering event and/or data measured or obtained responsive to the event, such as the strength of one or more pilots visible to the subscriber station. The record is either stored locally or transmitted to a remote location. In one implementation, the record is transmitted to a remote location, and stored in a database holding like records relating to other subscriber stations.

50 Claims, 14 Drawing Sheets

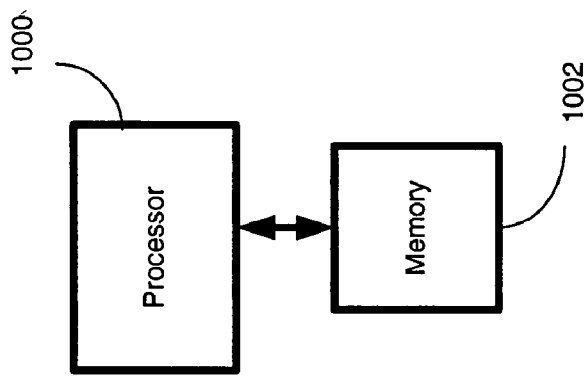
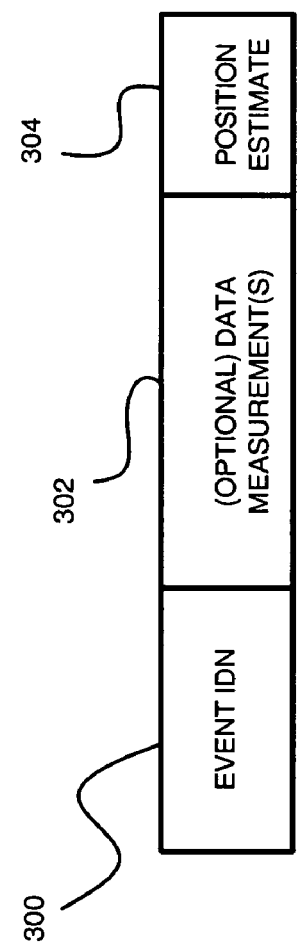

| Field | Length (bits) |
|---|---|
| MSG_TYPE ('00000101') | 8 |
| ACK_SEQ | 3 |
| MSG_SEQ | 3 |
| ACK_REQ | 1 |
| ENCRYPTION | 2 |
| REF_PN | 9 |
| PILOT_STRENGTH | 6 |
| KEEP | 1 |

Zero or more occurrences of the following record:

909 {
| Field | Length (bits) |
|---|---|
| PILOT_PN_PHASE | 15 |
| PILOT_STRENGTH | 6 |
| KEEP | 1 |

| Field | Length (bits) |
|---|---|
| RESERVED | 0 - 7 (as needed) |

FIGURE 9B

EVENT-TRIGGERED DATA COLLECTION

RELATED APPLICATIONS

This application claims priority to U.S. Provisional Application No. 60/444,246, filed on Jan. 30, 2003 and U.S. Provisional Application No. 60/463,910, filed on Apr. 17, 2003.

FIELD OF THE INVENTION

This invention relates to the field of wireless communications, and more specifically, to collecting data useful for network applications.

RELATED ART

Current approaches to collecting data useful for network applications are labor-intensive, ad hoc, and require the use of dedicated equipment and operators. In FIG. 1, for example, a special drive-test procedure involving a vehicle 118 equipped with dedicated receiving and monitoring equipment is invoked to collect data. In the particular example illustrated, the data is being collected for the purpose of optimizing the placement of repeater 110, and the extended coverage area provided by the combination of (donor) base station 108 and the repeater 110. The vehicle 118 is driven by a network technician along a route 120, and measurements of the strength of the pilot signal originating with base station 108 and relayed by the repeater 110 are taken at measurement locations 128a, 128b, 128c and 128d along the route 120. The positions of the measurements locations are either known a priori, or are obtained by dedicated GPS position determination equipment within the vehicle 118. The measurements are then used to optimize the placement of the repeater 110.

This approach to data collection is problematic because the route 120 driven by the network technician is typically ad hoc, and there is no guarantee it approximates the usage patterns of subscriber stations in the field.

Another problem is that the equipment and operators used to perform the drive test are typically dedicated, which increases the cost of data collection.

A third problem is that the data collected by this procedure is often insufficiently precise for use in network applications because it is only collected from a sampling of discrete measurement locations, and thus only provides a crude approximation of the coverage area of the network, or network component. In FIG. 1, for example, the pilot strength measurements obtained at the discrete measurement locations 128a, 128b, 128c, and 128d only provide an approximation of the extended coverage area corresponding to the base station 108/repeater 110 combination. Also, this data represents only a single snapshot in time of system performance.

SUMMARY OF THE INVENTION

A method of obtaining data useful for one or more network applications is described. The method is triggered by the occurrence of an event. The method involves obtaining a position estimate for a subscriber station. A record is then formed, associating the position estimate with an identifier of the triggering event, or data measured or obtained responsive to the triggering event, or both. The record is then stored or transmitted. In one embodiment, the method is performed in whole or in part by each of one or more subscriber stations. In another embodiment, the method is performed in whole or in part by each of one or more other network entities, such as a base station or a position determination entity. In a third embodiment, the method is performed by each of a combination of one or more subscriber stations and one or more other network entities. In one configuration, upon the occurrence of the triggering event, a position fix for a subscriber station is initiated, and a record is formed from the position estimate resulting from this fix. Alternatively, the record is formed from a previously-obtained position estimate for the subscriber station which is still considered accurate. In one implementation, the record is stored locally. Alternatively, it is transmitted to a remote location. In one implementation example, the record is transmitted to a remote location and stored in a database holding records formed of like data relating to other subscriber stations serviced by the network. The data in this database may then be used for network planning, optimization, validation, or operations purposes.

A memory tangibly embodying the foregoing method is described, as well as a system operating in accordance with the foregoing method. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3 illustrates an example format of a database record formed of data resulting from the method of FIG. 2.

FIG. 9B illustrates the format of a pilot strength measurement message (PSMM) in an IS-95 compliant system.

FIG. 10 is a block diagram of an embodiment of a system for performing the method of FIG. 2.

DETAILED DESCRIPTION

As utilized herein, terms such as "about," "substantially," "approximately," and "near" are intended to allow some leeway in mathematical exactness to account for tolerances that are acceptable in the trade. Accordingly, any deviations upward or downward from the value modified by the terms "about," "substantially," "approximately," or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations in hardware, software, or any combination of hardware and software.

The phrase "base station" (BTS) includes omni-directional base stations, sectored base stations, and individual sectors within sectored base stations.

The phrase "GPS satellite" includes space vehicles (SVs).

The phases "wireless communication system," "system," or "network" means any system in which communication services are provided to subscriber stations over a dispersive medium, and include without limitation cellular, non-cellular, fixed wireless, AMPS, PCS, CDMA, TDMA, GSM, IS-95 complaint, CMDA-2000, and WCDMA compliant systems. These phrases also include without limitation wireless communications systems incorporating, integrating, or overlaid by a position determination system.

The phrase "position determination system" includes position determination systems overlaid onto, integrated within, or incorporated by a wireless communications system.

The term "record" means any association of two or more data items. In one implementation, the term "record" is any association of two or more data items treated as a unit.

Figure 1:
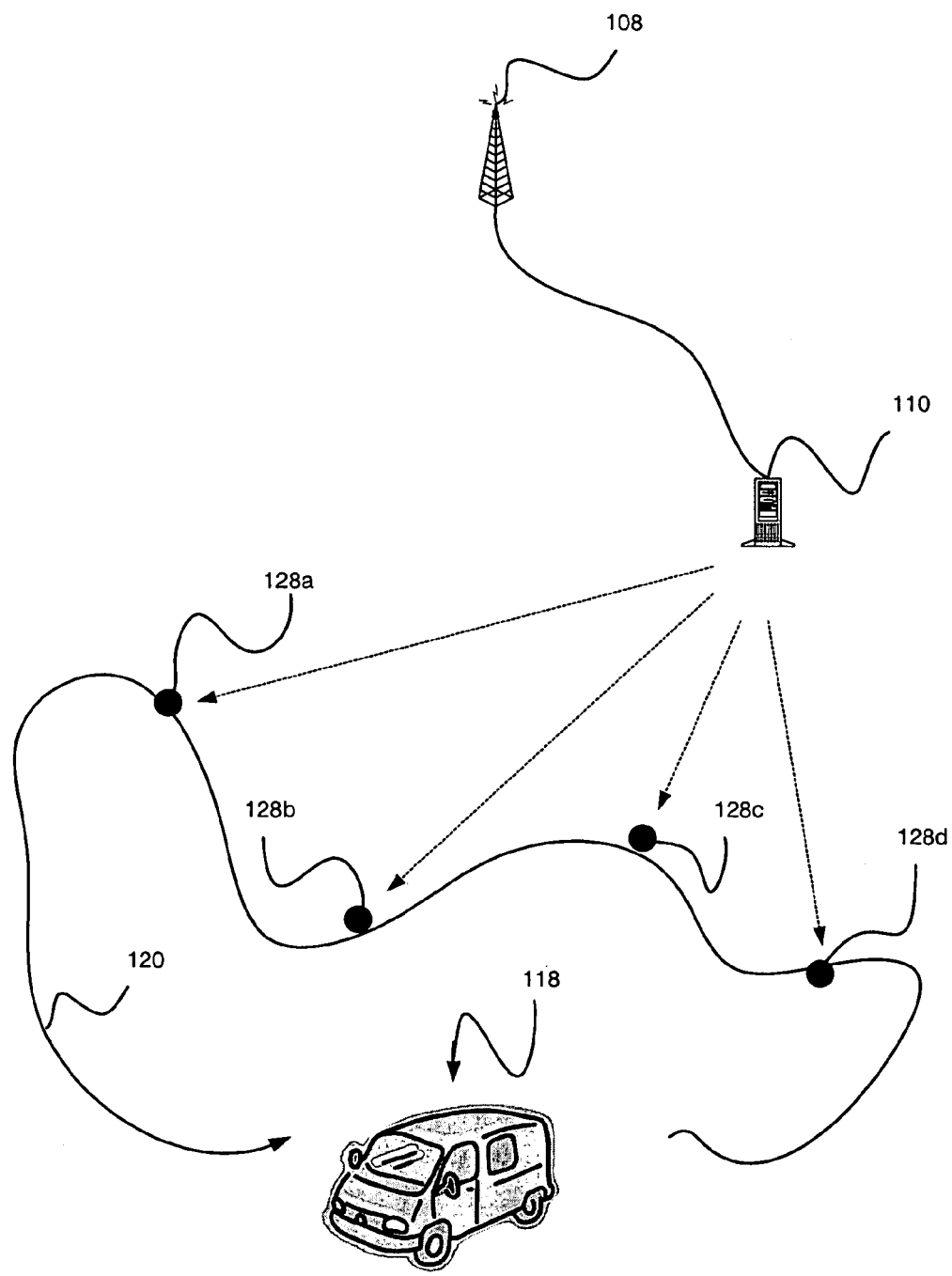
FIG. 1 is a diagram depicting an example of a drive test procedure for collecting data useful for network planning or optimization.
Figure 2:
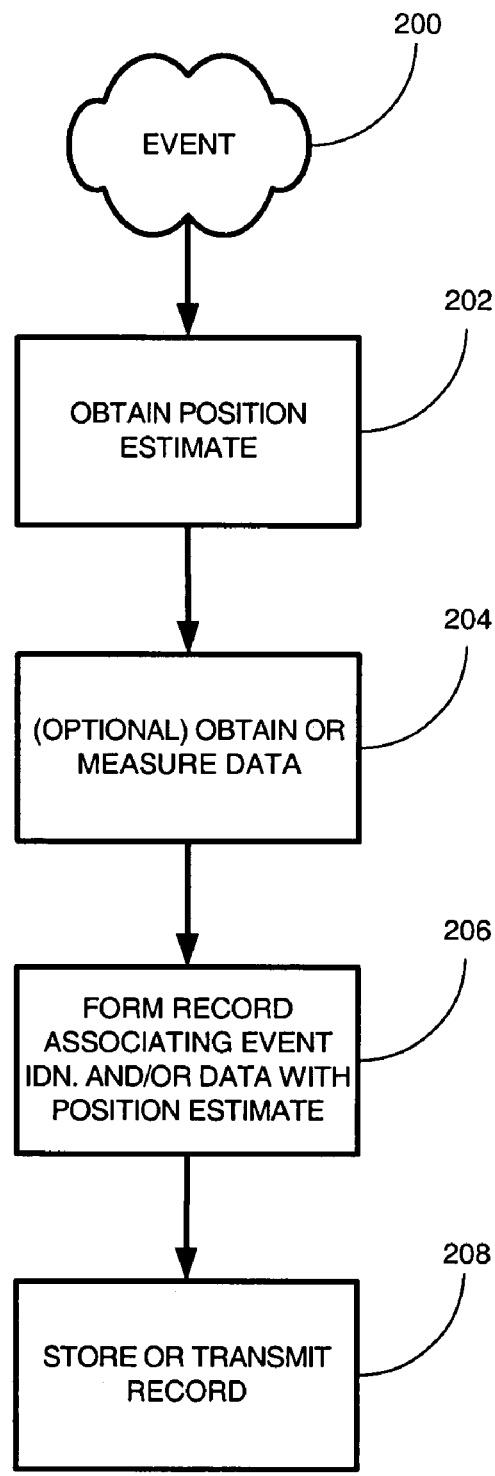
FIG. 2 is a flowchart of an embodiment of a method according to the invention of obtaining data responsive to the occurrence of an event.

A flowchart of an embodiment of a method of obtaining data useful for one or more network applications is illustrated in FIG. 2. In this embodiment, the method is triggered by the occurrence of an event 200. In one implementation, the method is performed in whole or in part by each of one or more subscriber stations. In another implementation, the method is performed in whole or in part by each of one or more other entities within the wireless communications system, such as a base station or a position determination entity. In a third implementation, the method is performed in whole or in part by each of a combination of one or more subscriber stations and one or more other network entities. The method comprises step 202, obtaining a position estimate for a subscriber station. In one implementation, this step comprises initiating a position fix for the subscriber station responsive to the event, and obtaining the resultant position estimate for the subscriber station. In another implementation, this step comprises obtaining a position estimate for the subscriber station resulting from a previous position fix which was valid or obtained close enough in time to the occurrence of the triggering event 200 so that the position estimate is still considered to be accurate. If performed, the position fix may be initiated by the subscriber station, or alternatively, may be initiated by another network entity using time measurements provided to it by the subscriber station. Some of the approaches which are possible for performing position fixes of subscriber stations will be discussed subsequently. The position fix results in a position estimate of the subscriber station.

The method further comprises optional step 204, performing or obtaining one or more data measurements responsive to the occurrence of the event. In one embodiment, the one or more data measurements are performed or obtained by the subscriber station. In another embodiment, the one or more data measurements are performed or obtained by another entity in the wireless communications system, such as a base station or position determination entity. Although this step is shown in FIG. 2 as occurring after step 202, it should be appreciated that it could occur in parallel with step 202.

The method also comprises step 206, forming a record associating the position estimate obtained in step 202 with an identifier of the triggering event 200, or one or more data measurements resulting from optional step 204, or both.

Step 208 follows step 206. In step 208, the record is either stored or transmitted. In one embodiment, the record is formed and stored locally at a subscriber station. In another embodiment, the record is formed at a subscriber station and transmitted to a remote location. In one implementation, it is formed at a subscriber station and transmitted to another network entity where it is stored in a database holding records embodying like data relating to other subscriber stations. In another implementation, it is formed at the network entity and then stored in the database.

An example format of such a record is illustrated in FIG. 3. In this particular example, the record comprises field 300, an identifier of the triggering event, optional field 302, one or more data measurements captured or collected responsive to the triggering event, and field 304, a position estimate for the subscriber station which is obtained responsive to the occurrence of the triggering event.

The method of FIG. 2 may be performed by or for each of a plurality of network entities operating within a wireless communications and/or position determination system. In one implementation, the method is performed by or for each of all or substantially all the subscriber stations operating in the system. In another implementation, the method is performed for authorized or selected subscriber stations associated with subscribers who have been given special consideration in the form of rebates, discounts or the like for allowing their subscriber stations to be used in the process of data collection. The records for all these subscriber stations may be collected and stored in a centralized database. Data derived from these records is well suited for network planning, optimization, validation, or operations applications since each record associates an estimate of the position of the subscriber station at about the time of the occurrence of the triggering event with an event identifier, or one or more data measurements obtained responsive to the triggering event, or both. Compared to conventional approaches for collecting data, involving drive tests and the like, the method is less expensive because it is performed by equipment already present in the network, and does not require the use of dedicated equipment. It is also more accurate since the data which is collected is not ad hoc, reflects actual patterns of usage of subscriber stations in the field, and also is not limited to discrete sample points.

In one embodiment, the method of FIG. 2 is triggered by a network event. In this embodiment, a variety of network events are possible, including those initially observed by the subscriber station, and those initially observed by another entity in the network. Examples of triggering network events which are possible include actual or near dropped call conditions, the entering of the subscriber station into the coverage area of particular network or network entity, the exiting of the subscriber station from the coverage area of a particular network or network entity, the periodic expiration of a timer while the subscriber station is outside the coverage area of a network or network entity, an actual or near handoff condition, whether hard or soft, passage of the subscriber station between the coverage areas of two networks or network entities, passage of the subscriber station between the coverage areas of a donor base station and a repeater, detection at the subscriber station of an unexpected pilot or base station, or detection at the subscriber station of a pilot or base station absent from the subscriber station's neighbor or candidate lists. Other examples are possible so nothing in the foregoing should be construed as limiting.

In another embodiment, the method of FIG. 2 is triggered by a subscriber or user event, such as the initiation of a position fix, or an event which typically leads to initiation of a position fix, such as a 911 call, or the initiation of a position-dependent search for services in a Web-enabled subscriber station, such as a search for a restaurant or other facility within a certain range of the current location of the subscriber station. Other examples of user events are possible, so these particular examples should not be taken as limiting.

In a third embodiment, the event is simply the expiration of a timer, or other timing element such as a counter counting up to or down to a target or level, or similar occurrence.

Figure 4:
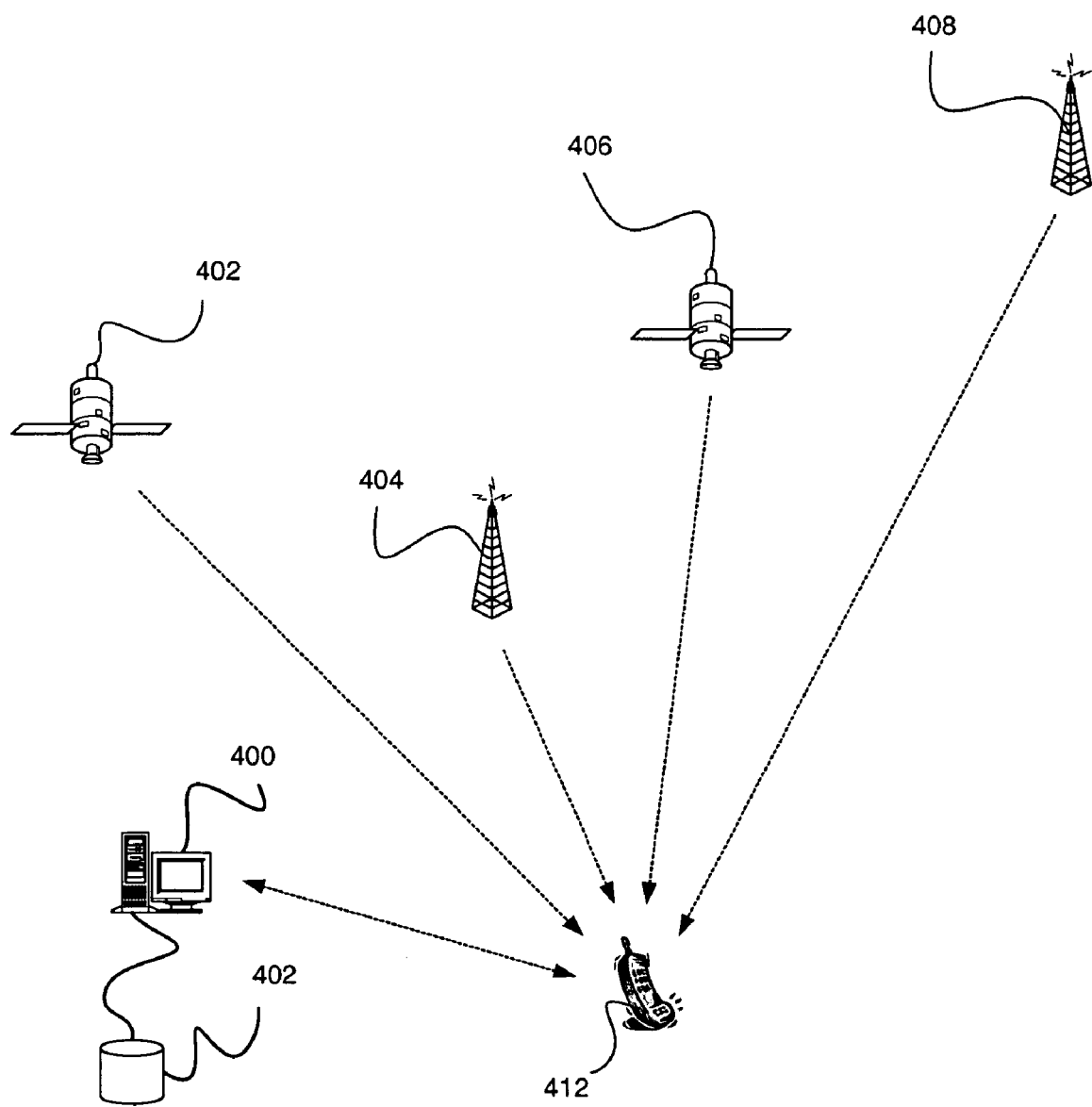
FIG. 4 illustrates an example of a hybrid position determination system overlaid onto a wireless communications system.

In one embodiment, the position of the subscriber station is determined through a position determination system overlaid onto the wireless communications system in which the subscriber station is operating. FIG. 4 illustrates an example of such a system. As illustrated, subscriber station 412 receives signals transmitted by a plurality of reference sources 402, 404, 406, and 408 visible to a receiver in the subscriber station. As illustrated, the reference sources may be base stations (BTSs), GPS satellites, or combinations of BTSs and GPS satellites.

Each of the reference sources transmits a signal which is modulated with an identification code which uniquely identifies the reference source. In one implementation, the identification codes are PN codes, which may differ in length or periodicity according to the reference source involved. For IS-95 compliant CDMA systems, the PN code is a sequence of 32,768 chips which is repeated every 26.67 msec. In current GPS systems, the PN code is a sequence of 1,023 chips which is repeated every one millisecond.

The subscriber station 412 is equipped with a correlator which is configured to derive a time measurement for each of the signals. In one example, the time measurements are time of arrival measurements. Alternatively, in lieu of the correlator deriving the time measurements, a processor within the subscriber station derives the time measurements from correlation functions provided to it by the correlator. The correlation functions correlate a composite signal received at the subscriber station with selected PN codes. If a system time reference is available, the subscriber station 412 uses this information to adjust the time measurements so they are in terms of system time. Alternatively, this task is performed by a position determination entity (PDE) 400 in communication with the subscriber station 412.

The subscriber station 412 communicates the time measurements to PDE 400. Upon receipt of this information, PDE 400 obtains the (known) positions of the reference sources 402, 404, 406, and 408 from one or more almanacs maintained in memory 402. It then determines the position of the subscriber station 412 using the time measurements and reference source positions. In one implementation, known triangulation or trilateration procedures are used to derive the position of subscriber station 412. Once determined, the position of the subscriber station 412 may be communicated by the PDE 400 to the subscriber station 412 or some other network entity.

Alternatively, the subscriber station 412 determines its own position from the time measurements as well as the positions of the reference sources 402, 404, 406, and 408, provided to it by PDE 400 or from other data sources.

In one implementation, the position estimate obtained in step 202 is obtained responsive to is the initiation of an advanced forward link trilateration (AFLT) position fix, i.e., one determined from time measurements derived from forward link transmissions originating from base stations. In a second implementation, the position estimate is obtained responsive to a GPS position fix, i.e., one determined from transmissions originating from GPS satellites. In a third implementation, the position estimate is obtained responsive to a GPS-assisted position fix. A GPS-assisted position fix is performed in two steps. In the first step, an approximate position of the subscriber station is estimated using forward link transmissions from base stations. In the second step, the position estimate from the first step is fine-tuned to a higher level of accuracy from GPS satellite transmissions.

In one embodiment, a method according to the invention proceeds in two phases. The first phase is a data collection phase. The second phase is a network applications phase. During the first phase, data is collected using the method of FIG. 2 by or for each of a plurality of subscriber stations and stored in a centralized database. During the second phase, the data is used to support one or more network applications.

In one embodiment of this two-phase process, during the first data collections phase, the method of FIG. 2 is performed in whole or in part by or for each of one or more authorized subscriber stations in the network. During the second network applications phase, data derived from the data collected in the data collections phase is used to support network operations. The triggering event for the data collections phase in this embodiment is a dropped call condition followed soon thereafter by a re-acquisition of communication services through a base station that was or may have been absent from the active list available to the subscriber station at the time of the dropped call. As is known, the active list is the list of base stations that are visible to the subscriber station and that are transmitting the user information for handoff in an IS-95 compliant system.

This triggering event indicates a situation in which a handoff to the pilot was prevented from occurring because the pilot signal for the target base station was initially too weak to be placed on the subscriber station's candidate list, but then suddenly became so strong that it blocked communication with the existing base station before the existing base station could add the target base station to the subscriber station's active set. This often happens if the transition in the target base station's pilot signal occurs more quickly than the rate at which the subscriber station searches through the pilot signals that are visible to it.

Figure 5A:
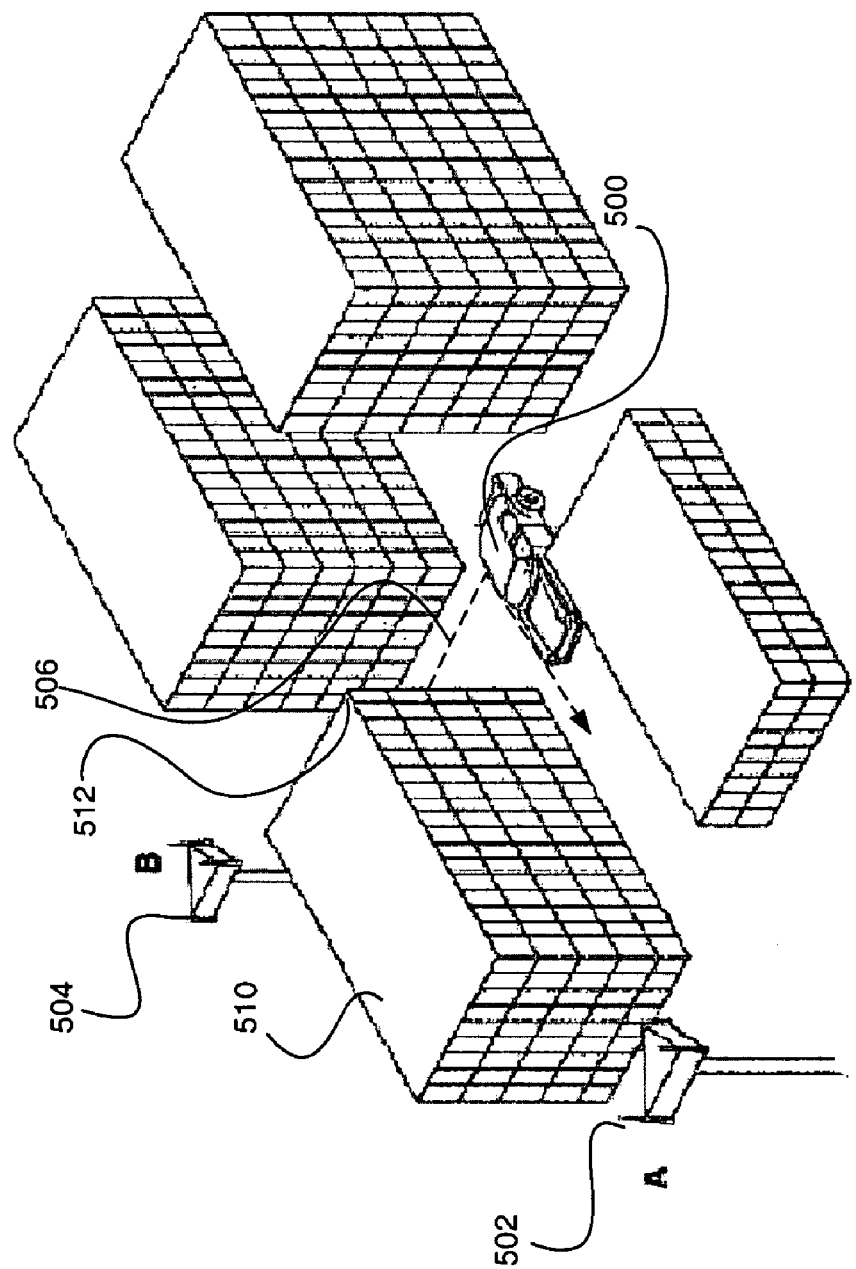
FIG. 5A illustrates an example of a failed handoff scenario.

An example of the occurrence of this situation is illustrated in FIG. 5A. A subscriber station is contained within a vehicle 500 which has just rounded a corner 512 of building 510 along route 506. Just prior to the vehicle 500 rounding the corner 512, the subscriber station is engaged in a call through base station 504. The base station 502 is not on the active list for the subscriber station at that time since base station 502 is not then visible to the subscriber station. After the vehicle 500 turns the corner 512, the call is dropped since the base station 504 is suddenly no longer visible to the subscriber station. Although the base station 502 is now visible to the subscriber station, a handoff to this base station does not occur since the base station 502 is not represented on the active list at the time of the dropped call. The subscriber station then re-acquires communications services through base station 502.

Figure 5B:
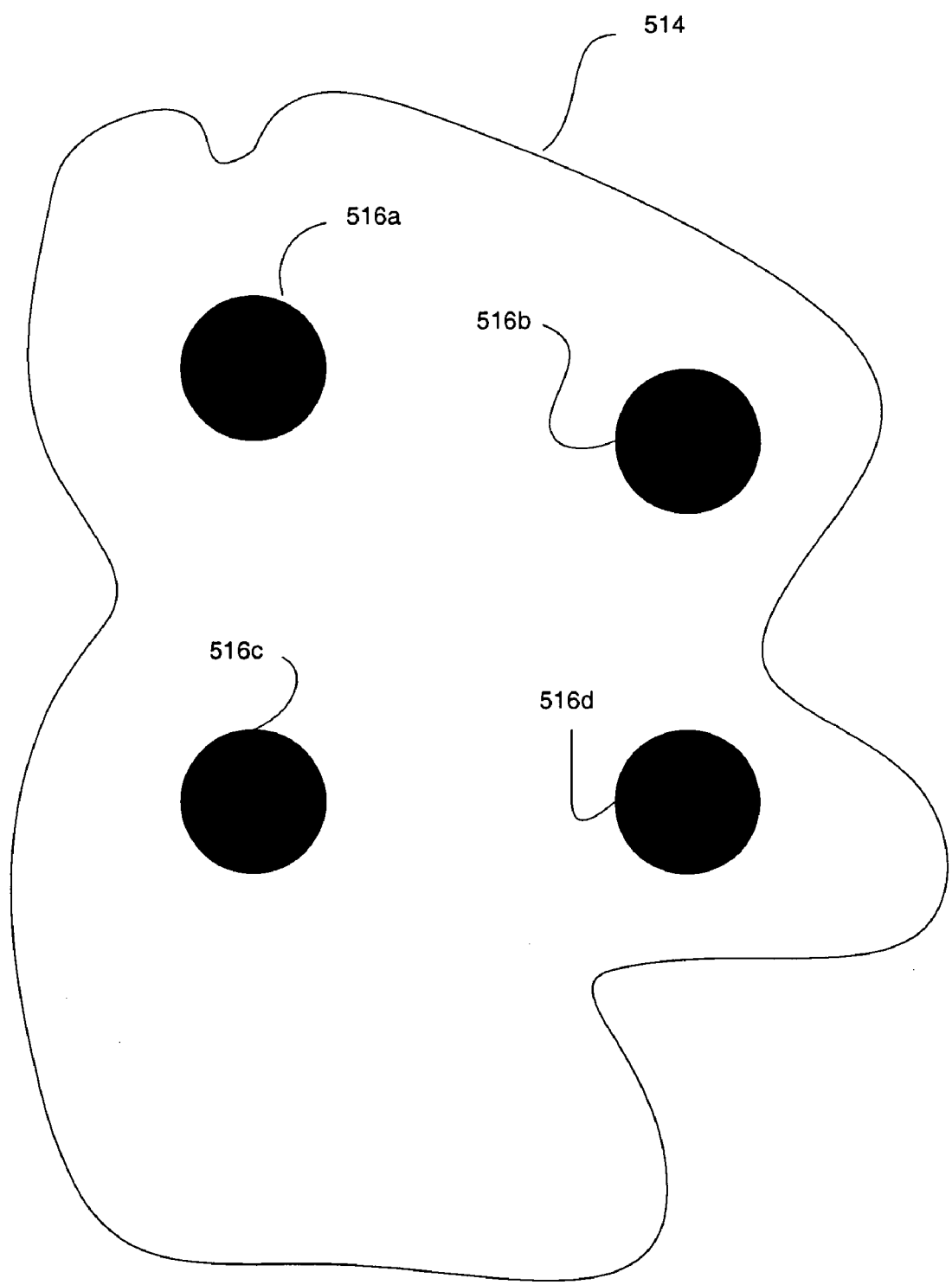
FIG. 5B illustrates an example of a map identifying failed handoff areas.

When this triggering event occurs, the subscriber station initiates or has initiated a position fix. If an insufficient number of base stations are visible to the subscriber station to allow for a sufficiently accurate AFLT-based position fix, a GPS or GPS-assisted position fix is initiated. A record is then formed associating the resultant position estimate with an identifier indicating a failed handoff/condition, and one or more identifiers (such as PN codes) identifying either or both the members of the active set just prior to the failed handoff/dropped call condition, or the members of the active set just after the failed handoff/dropped call condition. In one implementation, an identifier of the target base station 502 through which reacquisition occurred is also included. The record is then stored in a centralized database in which like records from other subscriber stations in the system are stored. This database is then used to form a map, such as that illustrated in FIG. 5B, in which failed handoff areas 516a, 516b, 516c, and 516d are identified within the coverage area 514 of the network. This database may also be used to form association data, which associates each of these failed handoff areas with either or both the members of the active set just prior to the failed handoff/dropped call condition, or the members of the active set just after the failed handoff/ dropped call condition. In one implementation, this association data also associates, for each failed handoff area, the target base station, i.e., the base station through which communications services were reacquired after the failed handoff during the data collection phase.

During the second phase of the method, this map and related association data is made available to subscriber stations in general to support network operations. In one embodiment, each of these subscriber stations performs the method illustrated in FIG. 5C. In step 518 of this method, a subscriber station performs or has performed a position fix in response to one or more triggering events, including user events such as 911 calls or location-dependent requests for services. In inquiry step 520, it compares or has compared the resultant position estimate with the locations of the failed handoff areas on the map. If the subscriber station is at or near one of the failed handoff areas identified on the map, step 522 is performed. In step 522, the target base station associated with the failed handoff area is forced onto the candidate list for the subscriber station and/or the hand off sensitivity of the system is otherwise increased. This allows the network to initiate a handoff to this base station, thus avoiding the dropped call situation.

Figure 5C:
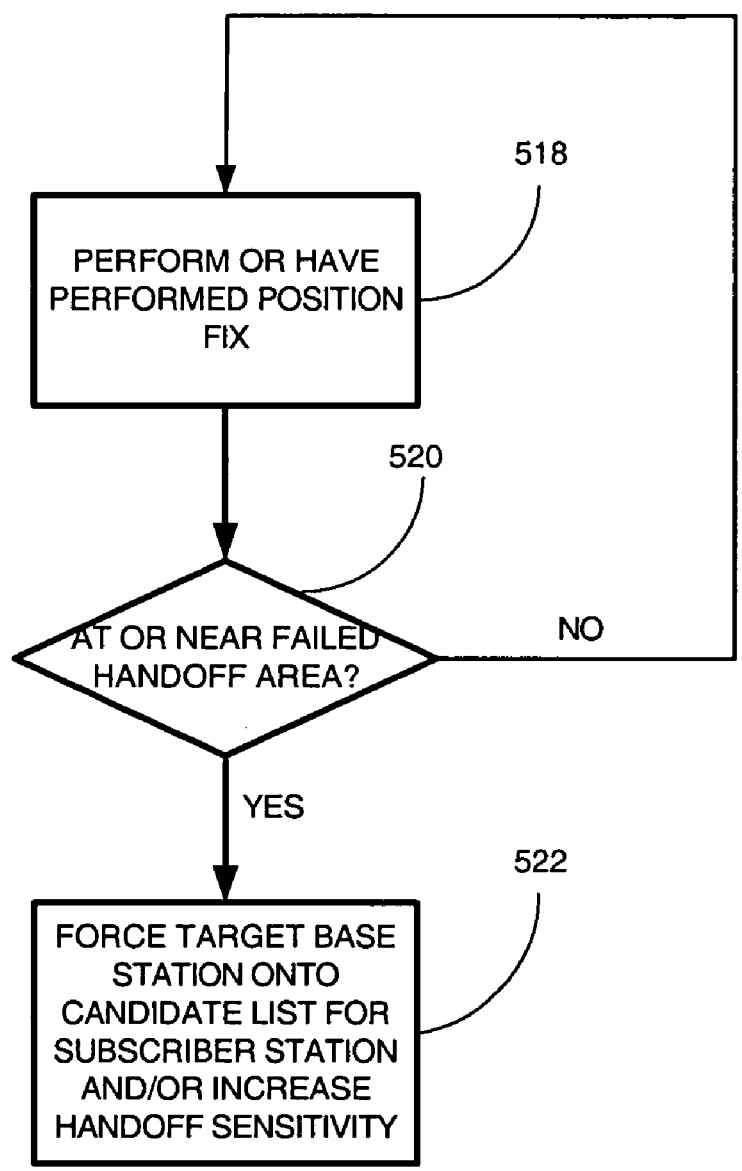
FIG. 5C is a flowchart of an embodiment of a method performed during network operations when a subscriber station moves into or is located in a failed handoff area.

Alternatively, the method of FIG. 5C is performed by another entity within the network, such as the base station servicing the subscriber station at the time the subscriber station roams into the failed handoff area, or a PDE. In this embodiment, when the subscriber station encounters a failed handoff area, the network entity forces the target base station onto the subscriber station's active list. By doing so, the network entity in effect forces the initiation of a handoff to the target base station.

In a second embodiment of the two-phase method, in the first data collections phase, failed handoff areas are identified as described in the previous embodiment. In the second network applications phase, however, when it is detected that a subscriber station is roaming into or operating within a failed handoff area, in lieu of forcing a base station onto the subscriber station's candidate or active lists, one or more thresholds used by the subscriber station (or the base station servicing the subscriber station) for supporting handoffs are modified in a way that hopefully allows the subscriber station to initiate or have initiated a handoff condition soon enough to avert a dropped call condition.

In one implementation, the T_ADD threshold applicable to a subscriber station is lowered when that subscriber station roams into a failed handoff area. As is known, in an IS-95 compliant system, the T_ADD threshold is an absolute threshold for determining whether a base station on the subscriber station's neighbor list is added to the subscriber station's candidate list. In this implementation, when the subscriber station enters a failed handoff area the T_ADD threshold applicable to that subscriber station is lowered. Then, assuming the target base station associated with the failed handoff area is already on the subscriber station's neighbor list, by lowering the T_ADD threshold sufficiently, the pilot associated with the target base station is moved sooner to the subscriber station's candidate list, thus allowing the network to initiate a handoff to that base station sooner and hopefully before a dropped call situation ensues.

Alternatively or in addition to lowering the T_ADD threshold, when the subscriber station enters the failed handoff area, the target base station is forced onto the subscriber station's neighbor list. That allows the network to initiate handoffs to this base station even if that base station were not otherwise on the subscriber station's neighbor list.

In another variant, in addition to or as an alternative to lowering the T_ADD threshold and/or forcing the target base station onto the subscriber station's neighbor, active or candidate lists, the T_COMP threshold applicable to a subscriber station is lowered when that subscriber station roams into a failed handoff area. As is known, in an IS-95 compliant system, the T_COMP threshold is a relative threshold which determines when a base station is moved from the subscriber station's neighbor list to the candidate list. By lowering the T_COMP threshold, the target base station is moved sooner to the candidate list applicable to the subscriber station, thus allowing the network to initiate a handoff to that base station sooner and hopefully before a dropped call condition ensues.

In yet another variant, in addition or as an alternative to lowering the T_ADD and/or T_COMP thresholds and/or forcing the target base station onto the subscriber station's neighbor or candidate lists, when the subscriber station roams into a failed handoff area, the network simply forces the target base station is onto the subscriber station's active list. As is known, in an IS-95 system, the active list is the list of base stations through which the subscriber station is concurrently in communication with. The presence of multiple base stations on the active list indicates that the subscriber station is in a soft handoff condition. By forcing the target base station onto the subscriber station's active list, the network initiates a soft handoff condition with the target base station.

In a third variant, the search time for searching through the pilot signals on the subscriber station's neighbor and/or candidate lists is reduced to allow earlier detection of whether one or more of these pilot signals should be re-categorized. In one implementation, the search time is reduced by altering the filter time constant which governs the time required to search through pilots on the subscriber station's neighbor and candidate lists. Reduction of this search time allows pilots which have exceeded the applicable T_ADD and T_COMP thresholds to be moved faster onto the subscriber station's candidate list. That in turn will allow the network to initiate sooner soft handoff conditions when the subscriber station roams into a failed handoff area. In one example, the search time is reduced from a maximum of 40 ms to a maximum of 10 ms.

Figure 6:
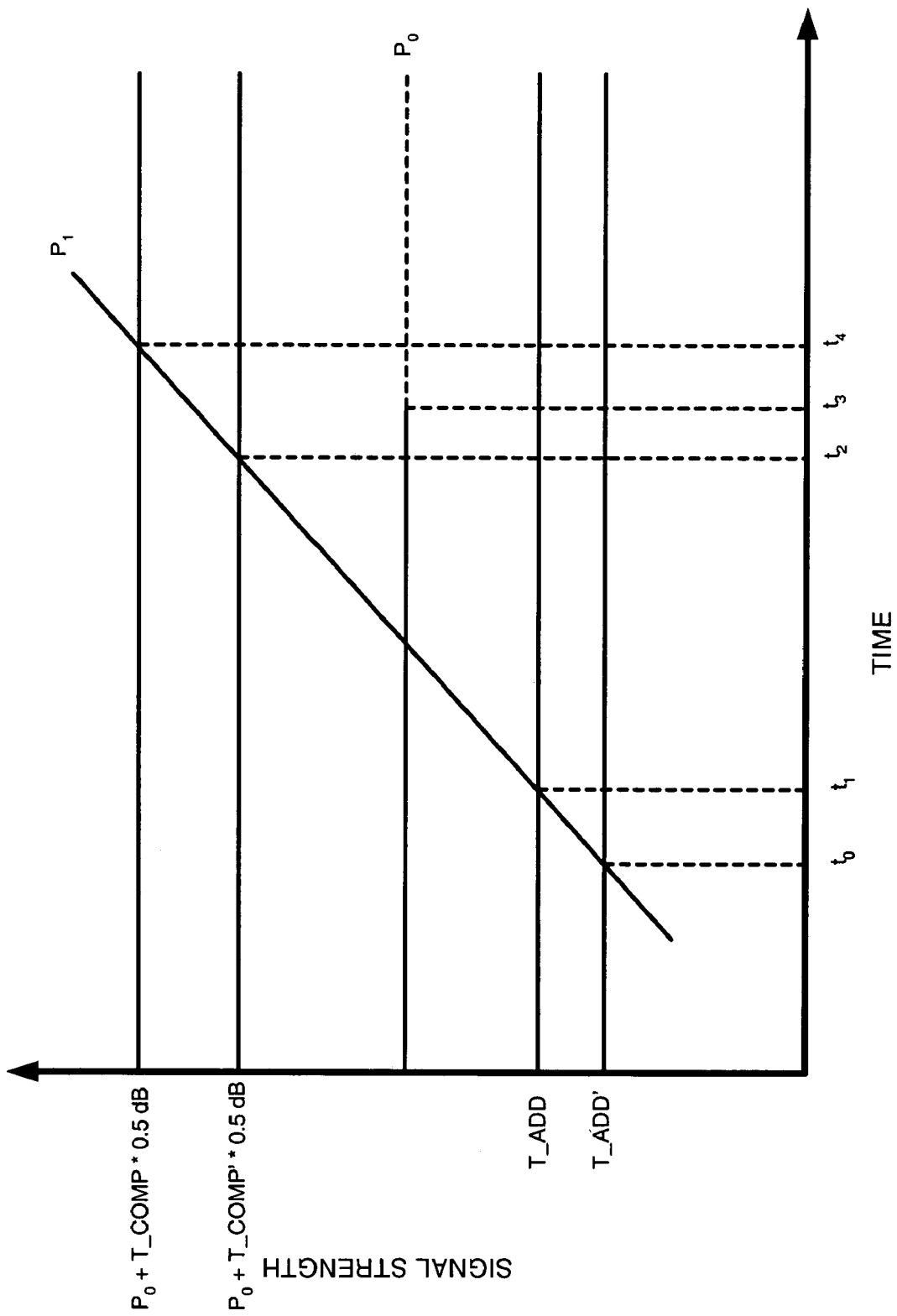
FIG. 6 is a graph illustrating the effect of lowering one or more handoff-related thresholds applicable to a subscriber station when that subscriber station moves into a failed handoff area.

The operation of an example of this implementation may be further explained with reference to FIG. 6. It is assumed that a subscriber station is communicating with a base station having the pilot signal $P_0$ at the time the base station roams into a failed handoff area. The pilot $P_0$ is therefore on the subscriber station's active list. As the subscriber station enters the failed handoff area, it begins sensing the target pilot signal, $P_1$. Upon entering the failed handoff area, the subscriber stations lowers the T_ADD and T_COMP thresholds applicable to it, from T_ADD to T_ADD' and T_COMP to T_COMP' respectively.

At time $t_0$, the strength of the pilot $P_1$ exceeds T_ADD'. Accordingly, the subscriber station sends a pilot strength measurement message (PSMM) to the servicing base station associated with the pilot $P_0$, reporting the strength of the pilot $P_1$ and directing the servicing base station to add the pilot $P_1$ to the subscriber station's candidate list. The time $t_1$ is the time the pilot $P_1$ would have been added to the subscriber station's candidate list had the T_ADD threshold remained in effect.

At time $t_2$, the strength of the pilot $P_1$ exceeds the strength of the pilot $P_0$ by the amount T_COMP'×0.5 dB. In this particular example, it is assumed that the subscriber station moves a target base station from the neighbor to the candidate lists when the strength of the pilot station for the target base station exceeds that of a servicing base station by the amount T_COMP'×0.5 dB. Accordingly, at time $t_2$, the subscriber station sends another PSMM to the servicing base station reporting the strength of the pilot $P_1$ and directing the servicing base station to add the target base station to the subscriber station's candidate list. Upon receiving this second PSMM, the network is assumed to move the target base station to the active list, and thus initiate a soft handoff condition with the target base station.

At the time $t_3$, the pilot $P_0$ is no longer visible to the subscriber station, and is dropped from the subscriber station's active (and candidate) lists. However, any call which is ongoing at the time the subscriber station enters the failed handoff area is not dropped since a soft handoff to the target base station was initiated before time $t_2$. The time $t_4$ is the time the soft handoff to the target base station would have been initiated had the threshold T_COMP remained in effect. Since the time is after the $t_3$, had T_COMP remained in effect, a dropped call situation would have occurred. Thus, by lowering the T_COMP threshold to T_COMP', it can be seen that a soft handoff to the pilot $P_1$ was initiated sooner, thus averting the dropped call situation.

In a third embodiment of the two-phase method, in the first data collections phase, data is collected by or for one or more authorized subscriber stations and stored in a centralized location. In the second network applications phase, this data is used to support one or more network planning or optimization applications.

Figure 7:
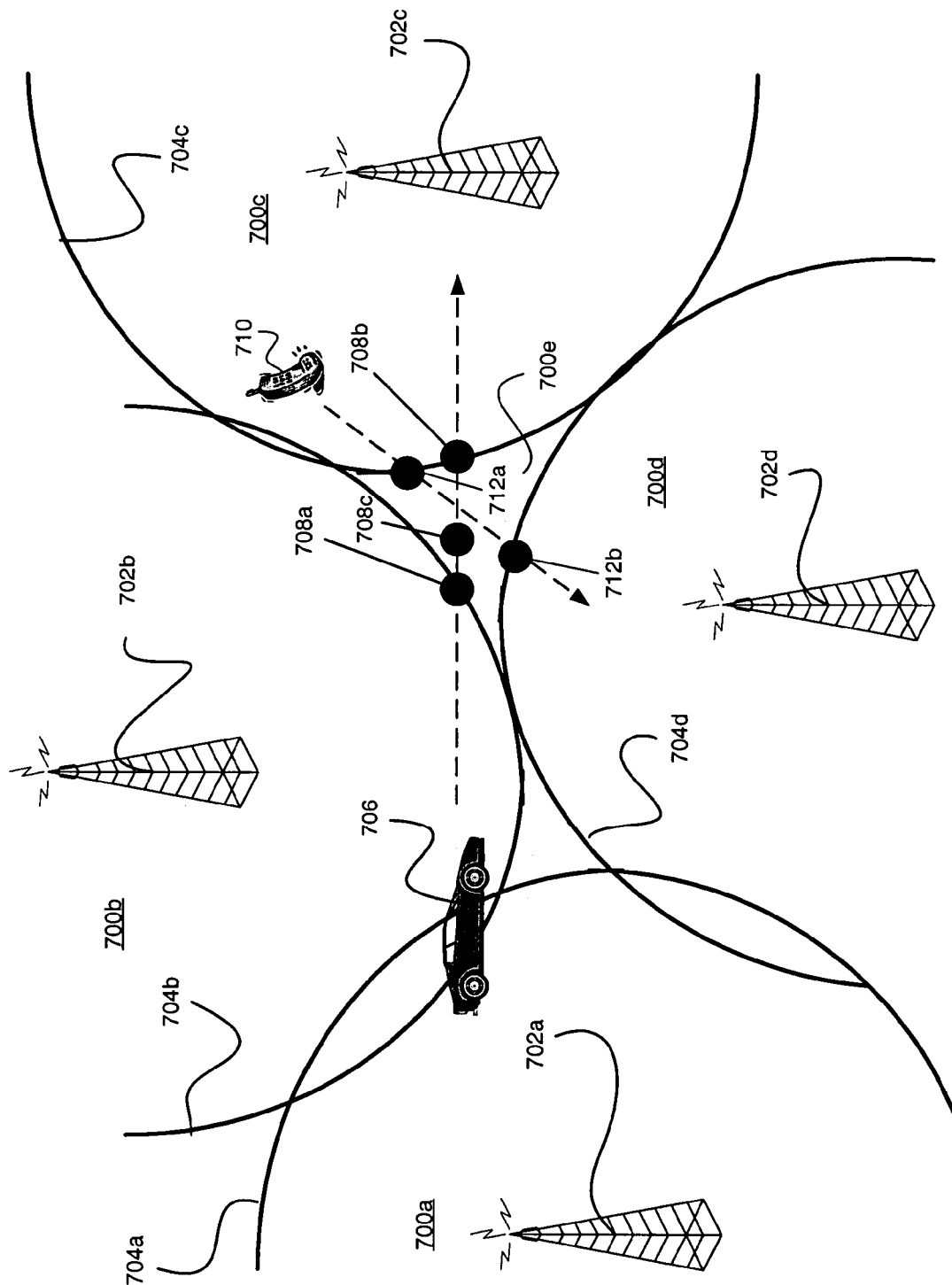
FIG. 7 illustrates an example of a scenario in which the method of FIG. 2 is performed when a selected subscriber station moves into, out of, or through a coverage gap.

The data collections phase of this embodiment may be explained with reference to FIG. 7. FIG. 7 illustrates a cellular wireless communication system comprising cells 700a, 700b, 700c, and 700d. Each of these cells is serviced respectively by base stations 702a, 702b, 702c, and 702d. The coverage areas of these cells are respectively identified with numerals 704a, 704b, 704c, and 704d. A gap or hole in the combined coverage areas of these base stations is identified with numeral 700e. A position determination system is assumed to be overlaid over this wireless communications system. This position determination system may be an AFLT, GPS, or GPS-assisted system.

Authorized subscriber stations operating within this wireless communication system are configured to perform or have performed in whole or in part the method of FIG. 2, and thereby collect data to support network planning or optimization applications. In FIG. 7, one such subscriber station is assumed to be located within vehicle 706. Another such subscriber station is identified with numeral 710.

In one implementation of this embodiment, the triggering event for invocation of the method of FIG. 2 is when an authorized subscriber stations roams into the gap 700e in the coverage area of the system. In other implementations, the triggering event is when an authorized subscriber station roams out of the coverage gap. In a third implementation, the triggering event is when the subscriber station moves within the coverage gap. In a fourth implementation, the triggering event is any combination of one or more of the foregoing. In one example, the roaming of the subscriber station into a coverage gap is detected when a dropped or near-dropped call condition is present, or when no pilots are visible to the subscriber station, or both. Similarly, the roaming of the subscriber station out of a coverage gap is detected when the subscriber station reacquires communications services.

In the example illustrated in FIG. 7, when one of the authorized subscriber stations roams into the coverage gap 700e, it either initiates or has initiated a position fix, or it accesses or has accessed a position estimate from a previous position fix performed close enough in time to the underlying event that the position estimate is still considered accurate. Thus, the subscriber station in vehicle 706 initiates or has initiated a position fix or otherwise accesses or has accessed a position estimate at location 708a, when the vehicle roams into the coverage gap 700e. Similarly, the subscriber station 710 initiates or has initiated a position fix at location 712a or otherwise accesses or has accessed a position estimate, when it roams into the coverage gap 700e.

If a position fix is performed, in one embodiment, a GPS position fix is first attempted. If that is unsuccessful, a GPS-assisted position fix is then attempted. An AFLT-based position fix is attempted in this embodiment as a last resort. In another embodiment, a check is made whether there are a sufficient number of base stations visible to the subscriber station to allow for an AFLT-based position fix. If there are an insufficient number of base stations visible to the subscriber station at the time it enters the coverage gap to allow for an AFLT-based position fix, the position fix in this embodiment is performed from GPS satellite transmissions assuming a GPS or GPS-assisted position determination system is available. Other embodiments are possible so nothing in the foregoing should be taken as limiting.

Alternatively, or in addition, the subscriber station initiates or has initiated a position fix or otherwise obtains or has obtained a position estimate upon re-acquiring communications services when it exits the coverage gap. The position fix, if initiated, may be performed using AFLT transmissions, GPS transmissions, or combinations of both. Thus, in FIG. 7, the subscriber station in vehicle 706 may initiate or have initiated a position fix or otherwise obtain or has obtained a position estimate at location 708b, when it exits the coverage gap 700e. Similarly, the subscriber station 712b may initiate or have initiated a position fix or otherwise obtain or have obtained a position estimate at location 712b, when it exits the coverage gap.

The subscriber station may also initiate or have initiated periodic position fixes (through a timer or the like) while it is moving through the coverage gap. These position fixes will likely be implemented with GPS or GPS-assisted transmissions since AFLT transmissions are by definition not as readily available to the subscriber station while it is in the coverage gap. Thus, in FIG. 7, the subscriber station in vehicle 706 may initiate or have initiated a position fix at location 708c, while it is moving through the coverage gap. This position fix may be initiated upon expiration of a timer which was initiated when the subscriber station roamed into the coverage gap. This timer may be periodically re-initiated until the subscriber station reacquires communication services. The subscriber station may thereby initiate or have initiated periodic position fixes while it is moving through the coverage gap.

For each of the position estimates which are obtained, the subscriber station forms or has formed a record associating an identifier of the triggering event, whether entering, exiting, or moving through a coverage gap as the case may be, with the position estimate for the subscriber station. This record is then stored or transmitted for storage in a database containing like records relating to authorized subscriber stations. After a time, the data in this database is made available to support one or more network planning or optimization applications.

Figure 8:
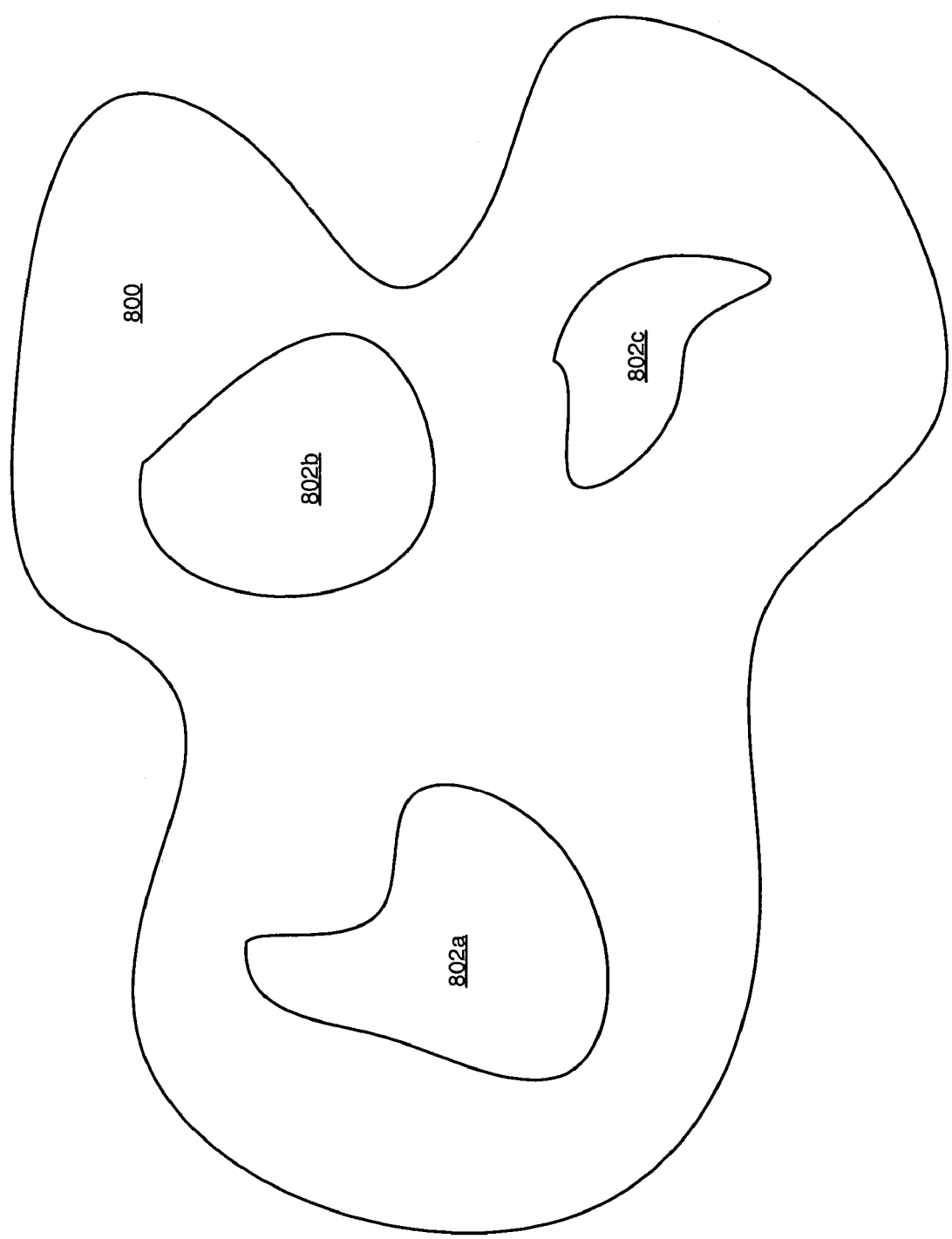
FIG. 8 illustrates an example of a map identifying coverage gaps.

In one such application, a map, such as that illustrated in FIG. 8, is derived from the data in the database. This map indicates the coverage area 800 of the wireless communications system, and the coverage gaps 802a, 802b, 802c in that coverage area. This map is then used to support one or more network planning or optimization applications in which the positions of existing base stations and/repeaters are optimized, and/or base stations and/or repeaters are added to the system to eliminate or reduce the coverage gaps.

In a fourth embodiment of the two-phase method, in the first phase, data collection is performed for or by one or more authorized subscriber stations operating in a wireless communications system overlaid by a position determination system. Once collected, the data is stored in a centralized location. In the second phase, the data is used to support one or more network planning, optimization or validation applications.

The first data collections phase may be explained with reference to FIG. 9A. This figure illustrates a cellular wireless communications system comprising cells 900a and 900b serviced respectively by base stations 904a and 904b. The coverage areas of the cells are respectively identified with numerals 906a and 906b. A position determination system is assumed to be overlaid onto the wireless communications system.

The one or more authorized subscribers operating within the system are configured to perform or have performed in whole or in part the method of FIG. 2, where the triggering event is an initiation of a position fix, or any user event which normally gives rise to the initiation of a position fix by the subscriber station. Examples are 911 calls or requests in Web-enabled subscriber stations for a location dependent facility or service, such as a restaurant located within a certain distance of the subscriber station.

Figure 9A:
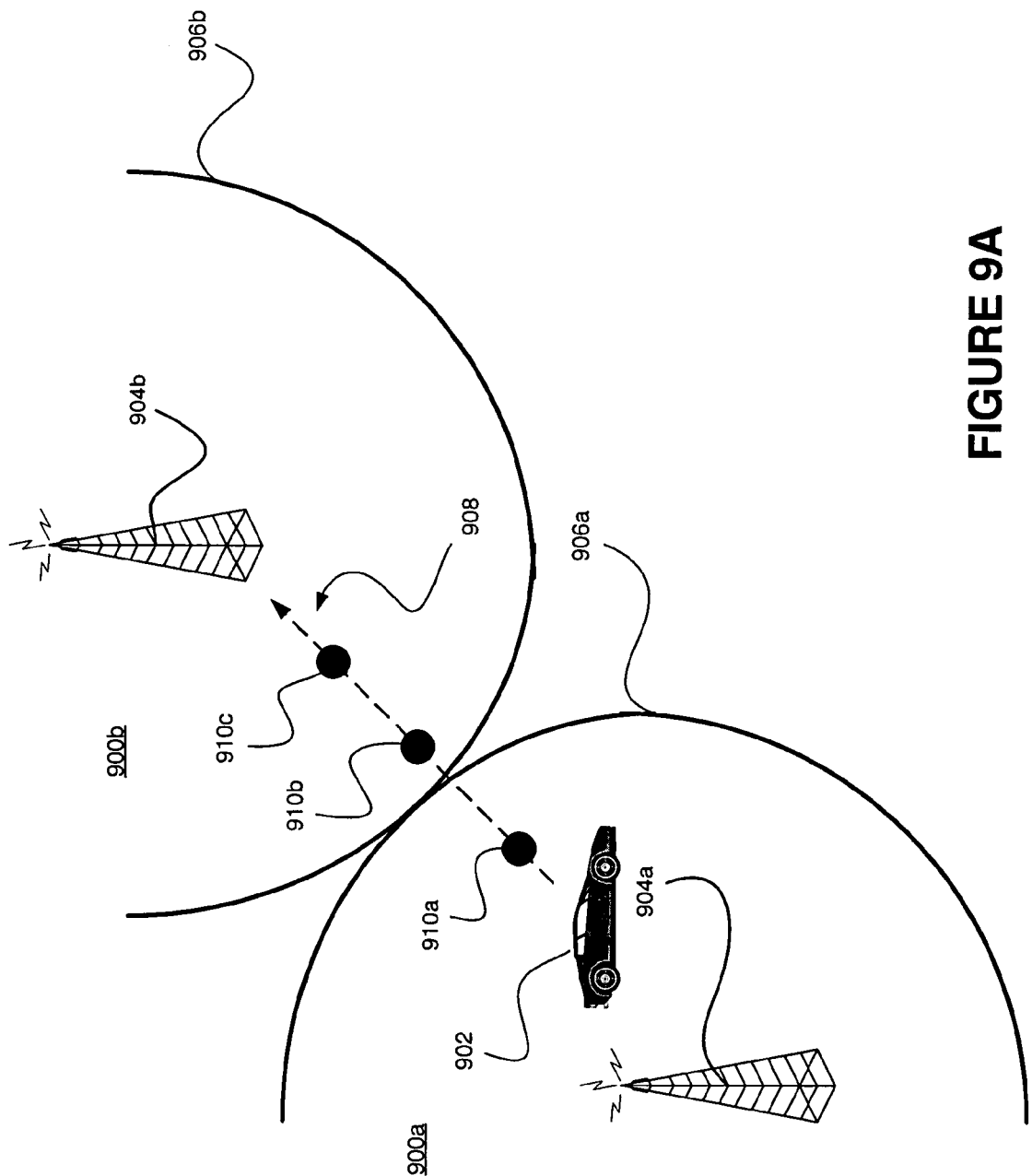
FIG. 9A illustrates an example of a scenario in which the method of FIG. 2 is performed in response to a user event.

In the example illustrated in FIG. 9A, a subscriber station within vehicle 920 driving along route 908 is assumed to initiate or have initiated a position fix or otherwise obtain or have obtained a position estimate at locations 910a, 910b, 910c. Upon obtaining a position estimate, the subscriber station measures or has measured the strength and/or phase of one or more pilots visible to the subscriber station, and prepares or has prepared one or more records associating these one or more measurements with the position estimate for the subscriber station.

In one implementation, the subscriber station prepares or has prepared a modified PSMM, associating a conventional PSMM, which contains strength measurements of one or more pilots visible to the subscriber station, with the position estimate for the subscriber station. FIG. 9B illustrates a conventional PSMM, with portion 909 repeated for each of the one or more pilots visible to the subscriber station which are reported. The meanings of each of the fields in FIG. 9B are known, and need not be detailed further in this disclosure. This message is augmented in this implementation with a field for the position estimate of the subscriber station.

The one or more records are then stored or transmitted for storage in a database containing like records relating to other subscriber stations. After a time, when a sufficient number of records has been built up in the database, the second phase of the process is initiated. In this second phase, one or more gradient maps are derived from the database. Each of these gradient maps represent the gradient of the coverage area of a base station in the network.

Figure 9C:
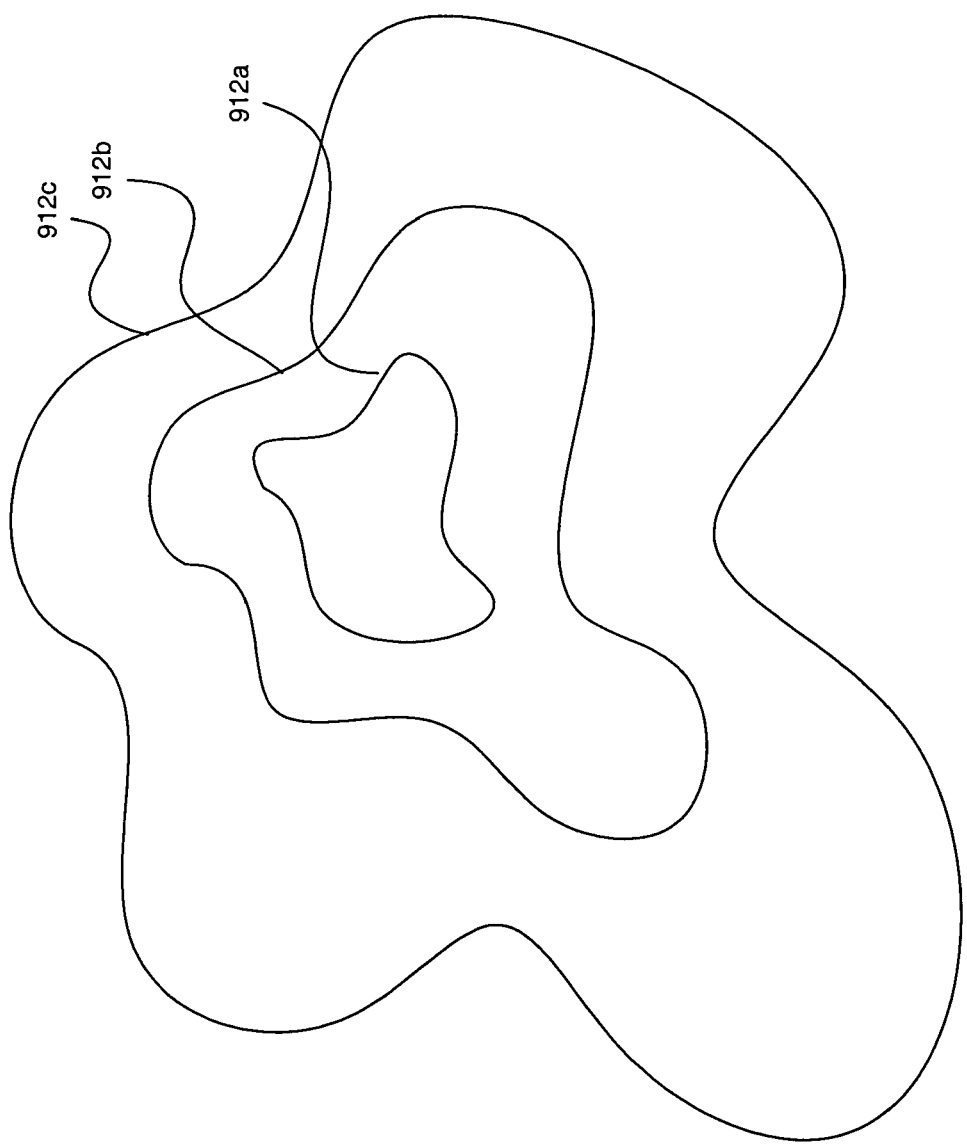
FIG. 9C illustrates an example of a gradient map depicting the coverage area of a base station in a wireless communications system.

FIG. 9C illustrates an example of a gradient map such as might be derived from the data stored in the database. As illustrated, the map comprises a plurality of ordered concentric contours 912a, 912b, 912c, with each contour associated with a particular pilot signal strength, and the order of contours being such that the pilot signal strength progressively decreases from the inner to the outer contours. Thus, in the example of FIG. 9C, contour 912a might indicate a strong pilot signal strength, contour 912b might indicate a medium-level pilot signal strength, and contour 912c might indicate a weak pilot signal strength at the outer confines of the coverage area of the base station. Once derived, these gradient maps may be used to support one or more network planning, optimization, or validation applications. In one example, they are used to validate an RF propagation model previously used for planning or optimizing the system.

In a fourth embodiment of this two-phase method, during the first data collections phase, the triggering event for data collection is when an authorized subscriber station loses service while in idle mode. Such a loss in service may occur, for example, when the subscriber station encounters a new pilot that is so strong it prevents the subscriber station from being able to decode the paging channel for the current pilot or any of its neighbors. When such a triggering event occurs, the position of the subscriber station is determined and associated with an identifier of this event and/or an identifier of the new pilot and/or a measurement of the strength of the new pilot. This data collection may be performed by or for each of a plurality of authorized subscriber stations. During the second network applications phase, a map of those areas of the network where these pilots are encountered is produced. In addition, these areas are investigated to determine if they are just weak signal areas or areas in which pilot/neighbor list management needs to be improved.

An embodiment of a system for obtaining data useful for one or more network applications is illustrated in FIG. 10. As illustrated, the system comprises processor 1000 and memory 1002.

The memory 1002 tangibly embodies a series of software instructions for performing the method of FIG. 2, or any of the embodiments, implementations, variants or examples thereof which have been described or suggested.

The processor is configured to access and execute the software instructions tangibly embodied by memory 1002. Through execution of these instructions, the processor 1000 performs the method of FIG. 2.

The system of FIG. 10 may be embodied by or incorporated in one or more authorized subscriber stations or other network entities operating within the position determination system of FIG. 4. The records formed by these entities are transmitted to the PDE 400, and stored in database 402. After a time, data derived from the data stored in this database may be used to support one or more network planning, optimization, validation or operations application as described. In the case in which the derived data is used to support a network operations application, such as supporting handoff, it may be necessary to make this derived data available to all subscriber stations operating in the system.

Figure 11:
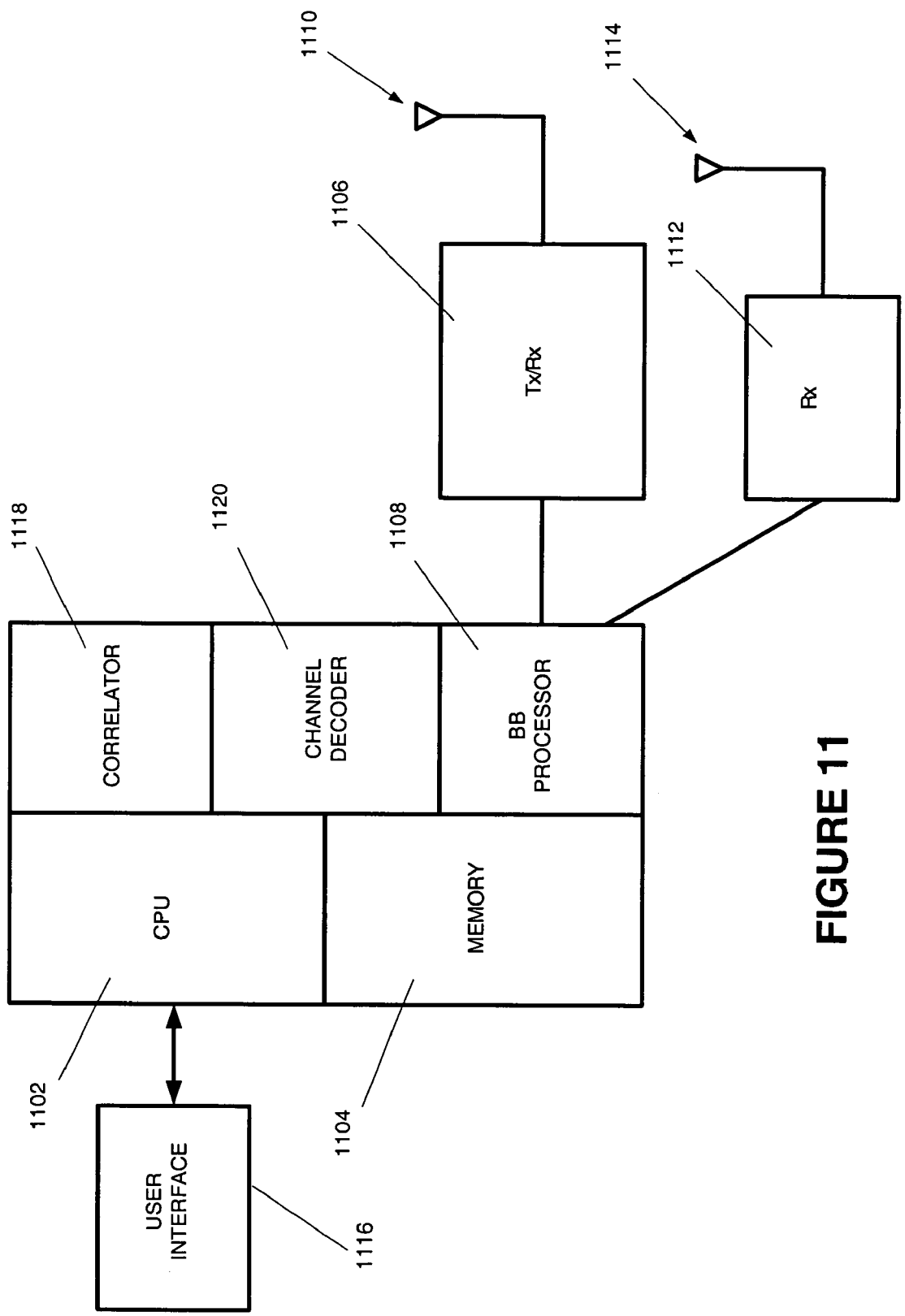
FIG. 11 is a block diagram of a subscriber station in a wireless communications system embodying or incorporating the system of FIG. 2.

An embodiment of a subscriber station embodying or incorporating the system of FIG. 10 is illustrated in FIG. 11. Other examples are possible so nothing in FIG. 11 should be taken as limiting.

Radio transceiver 1106 is configured to modulate baseband information, such as voice or data, onto an RF carrier, and demodulate a modulated RF carrier to obtain baseband information.

An antenna 1110 is configured to transmit a modulated RF carrier over a wireless communications link and receive a modulated RF carrier over a wireless communications link.

Baseband processor 1108 is configured to provide baseband information from CPU 1102 to transceiver 1106 for transmission over a wireless communications link. The CPU 1102 in turn obtains the baseband information from an input device within user interface 1116. Baseband processor 1108 is also configured to provide baseband information from transceiver 1106 to CPU 1102. CPU 1102 in turn provides the baseband information to an output device within user interface 1116.

User interface 1116 comprises a plurality of devices for inputting or outputting user information such as voice or data. The devices typically included within the user interface include a keyboard, a display screen, a microphone, and a speaker.

GPS receiver 1112 is configured to receive and demodulate a composite signal formed of pilot signals from GPS satellites visible to the subscriber station, and provide the demodulated information to correlator 1118. The composite signal is received over antenna 1114.

Radio transceiver 1106 is configured to receive and demodulate a composite signal formed of pilot signals transmitted by base stations visible to the subscriber station, and provide the demodulated information to correlator 1118. The composite signal is received over antenna 1110.

In this particular example, the GPS receiver 1112 and radio transceiver 1106 share the same filter chain, but it should be appreciated that examples are possible in which each is configured with a separate filter chain.

For GPS or GPS-assisted position fixes, correlator 1118 is configured to derive GPS correlation functions from the information provided to it by GPS receiver 1112. For AFLT or GSP-assisted position fixes, correlator 1118 is configured to derive base station correlation functions from the information provided to it by radio transceiver 1106.

Correlator 1118 is also configured to derive time of arrival and/or time difference of arrival measurements from the peaks of the correlation functions it derives. Alternatively, the CPU 1102 may derive this information from the correlation functions as provided to it by the correlator 1118.

This information may be used by the subscriber station to acquire wireless communications services and/or to determine its position or have its position determined by a PDE or other entity in the position determination system through AFLT-based, GPS-based, or GPS-assisted approaches.

Channel decoder 1120 is configured to decode channel symbols provided to it by baseband processor 1108 into underlying source bits. In one example, where the channel symbols are convolutionally encoded symbols, the channel decoder is a Viterbi decoder. In a second example, where the channel symbols are serial or parallel concatenations of convolutional codes, the channel decoder 1120 is a turbo decoder.

Memory 1104 in configured to hold software instructions embodying the method of FIG. 2, or any of the embodiments, implementations, examples or variants thereof which have been described or suggested.

CPU 1102 is configured to access and execute these software instructions, and thereby collect data useful for network planning, optimization, validation, or operations applications.

While various embodiments, implementations and examples have been described, it will be apparent to those of ordinary skill in the art that many more embodiments, implementations and examples are possible that are within the scope of this invention. Consequently, the invention is not to be limited except in relation to the appended claims.

What is claimed is:

1. A method of obtaining data useful for one or more wireless network applications, the method comprising performing the following steps:
   detecting an occurrence of a network event;
   obtaining a position estimate for a subscriber station operating within a wireless communications system responsive to detecting the occurrence of the network event;
   forming a record associating the position estimate for the subscriber station with at least one of an event identifier and data, measured or obtained, responsive to obtaining the position estimate; and
   storing or transmitting the record responsive to forming the record;
   wherein the network event includes at least one of the following: the subscriber station entering a coverage area, the subscriber station exiting a coverage area, and an expiration of a timer while the subscriber station is outside the coverage area of a wireless communications system.

2. The method of claim 1 wherein the network event is observed by the subscriber station.

3. The method of claim 1 wherein the network event is observed by an entity in the wireless communication system other than the subscriber station.

4. The method of claim 1 wherein the network event includes an actual or near dropped call condition.

5. The method of claim 1 wherein the network event includes a failed handoff condition.

6. The method of claim 1 wherein the network event includes a handoff or near handoff condition.

7. The method of claim 6 wherein the handoff condition includes a hard or soft handoff condition.

8. The method of claim 6 wherein the near handoff condition includes a hard or soft handoff condition.

9. The method of claim 1 wherein the network event includes a change in band condition.

10. The method of claim 1 wherein the network event includes passage of the subscriber station between the coverage areas of two wireless communications systems or system entities.

11. The method of claim 1 wherein the network event includes passage of the subscriber station between coverage areas of a donor base station and a repeater.

12. The method of claim 1 wherein the network event includes detection at the subscriber station of an unexpected or unexpectedly strong pilot.

13. The method of claim 1 wherein the network event includes detection at the subscriber station of an unexpected base station.

14. The method of claim 1 wherein the network event includes detection at the subscriber station of a pilot, which is absent from the subscriber station's neighbor list.

15. A method of obtaining data useful for one or more wireless network applications, the method comprising performing the following steps:
   detecting an expiration of a timer;
   obtaining a position estimate for a subscriber station operating within a wireless communications system responsive to detecting the expiration of the timer;
   forming a record associating the position estimate for the subscriber station with at least one of an event identifier and data, measured or obtained, responsive to obtaining the position estimate; and
   storing or transmitting the record responsive to forming the record;
   wherein the record associates the position estimate with one or more measurements of pilot strength and phase; wherein at least one of the pilots is associated with a traffic channel existing between the subscriber station and a base station; and wherein the traffic channel is at least one of a forward traffic channel, and a reverse traffic channel.

16. A method of obtaining data useful for one or more wireless network applications, the method comprising performing the following steps:
   detecting a user initiation of a 911 call;
   obtaining a position estimate for a subscriber station operating within a wireless communications system responsive to detecting the user initiation of the 911 call;
   forming a record associating the position estimate for the subscriber station with at least one of an event identifier and data, measured or obtained, responsive to obtaining the position estimate; and
   storing or transmitting the record responsive to forming the record,
   wherein the record associates the position estimate with one or more measurements of pilot strength and phase; wherein at least one of the pilots is associated with a traffic channel existing between the subscriber station and a base station; wherein the traffic channel is at least one of a forward traffic channel, and a reverse traffic channel.

17. A method of obtaining data useful for one or more wireless network applications, the method comprising performing the following steps:
   detecting a request for position-dependent services in a Web-enabled subscriber station;
   obtaining a position estimate for a subscriber station operating within a wireless communications system responsive to detecting the request for position-dependent services in the Web-enabled subscriber station;
   forming a record associating the position estimate for the subscriber station with at least one of an event identifier and data, measured or obtained, responsive to obtaining the position estimate; and
   storing or transmitting the record responsive to forming the record;
   wherein the record associates the position estimate with one or more measurements of pilot strength and phase; wherein at least one of the pilots is associated with a traffic channel existing between the subscriber station and a base station; and wherein the traffic channel is at least one of a forward traffic channel, and a reverse traffic channel.

18. A method of obtaining data useful for one or more wireless network applications, the method comprising performing the following steps:
   detecting an occurrence of a triggering event;
   obtaining a position estimate for a subscriber station operating within a wireless communications system responsive to detecting the occurrence of the triggering event;
   detecting an expiration of a timer;
   obtaining the position estimate for a subscriber station operating within the wireless communications system responsive to detecting the expiration of the timer;
   forming a record associating the position estimate for the subscriber station with at least one of an event identifier and data, representing one or more measurements of pilot strength or phase, measured or obtained, responsive to obtaining the position estimate; and
   storing or transmitting the record responsive to forming the record.

19. The method of claim 18 wherein at least one of the pilots is associated with a traffic channel existing between the subscriber station and a base station.

20. The method of claim 19 wherein the traffic channel is a forward traffic channel.

21. The method of claim 19 wherein the traffic channel is a reverse traffic channel.

22. The method of claim 1 wherein the position estimate is determined by the subscriber station.

23. The method of claim 1 wherein the position estimate is determined by an entity in the system other than the subscriber station.

24. The method of claim 23 wherein the other entity is a position determination entity.

25. The method of claim 1 wherein the record is stored locally at the subscriber station.

26. The method of claim 1 wherein the record is transmitted and stored at a remote location in the wireless communication system.

27. The method of claim 26 wherein the record associating the position of the subscriber station is stored in a database holding records associating the positions of other subscriber stations obtained by other subscriber stations serviced by the wireless communication system.

28. The method of claim 27 wherein base station almanac information is related to said database.

29. A memory storing a sequence of software instructions embodying the method of claim 1.

30. A system comprising a processor, and the memory of claim 29, wherein the processor is configured to access and execute the software instructions stored in the memory.

31. The system of claim 30 embodied by or incorporated within a subscriber station.

32. A wireless communications system for obtaining data useful for one or more network applications comprising:
one or more network entities each configured to (1) obtain or have obtained a position estimate for a subscriber station responsive to detecting an occurrence of a network event, (2) form or have formed a record associating the position estimate for the subscriber station with at least one of an identifier of the network event and data, measured or obtained, responsive to the obtaining or having obtained the position estimate, and (3) store or having stored the record in a database responsive to forming or having formed the record;
wherein the one or more network events comprise a failed handoff condition, further comprising a memory holding data representing a map of failed handoff areas derived from the database, and for each area, association data associating the area with one or more base stations.

33. The system of claim 32 comprising one or more subscriber stations configured to access data derived from the database and, upon detecting roaming into a failed handoff area using this data, forcing or having forced one or more base stations associated with the failed handoff area onto one or more lists applicable to the subscriber station for supporting handoffs.

34. The system of claim 32 further comprising one or more subscriber stations configured to access the data derived from the database and, upon detecting roaming into a failed handoff area using this data, adjusting or having adjusted one or more thresholds applicable to the subscriber station for supporting handoffs.

35. The system of claim 32 further comprising one or more subscriber stations configured to access the data derived from the database and, upon detecting roaming into a failed handoff area using this data, adjusting or having adjusted one or more search times applicable to the subscriber station for supporting handoffs.

36. The system of claim 32 wherein the one or more triggering events comprises a subscriber station roaming into, out of, or within a coverage gap.

37. The system of claim 36 further comprising a memory holding data derived from the database comprising a map of coverage gaps.

38. The system of claim 36 further comprising a memory holding data derived from the database and representing one or more gradient maps.

39. A method of obtaining data useful for one or more wireless network applications comprising performing the following steps by or for each of a plurality of subscriber stations operating within a wireless communications system:
detecting an occurrence of a network event;
obtaining a position estimate for a subscriber station responsive to the detecting the occurrence of the network events;
forming a record associating the position estimate for the subscriber station with at least one of an identifier of the triggering event and data measured or obtained responsive to the obtaining the position estimate; and
storing or having stored the record in a database responsive to the forming the record;
wherein the network event includes at least one of the following: the subscriber station entering a coverage area, the subscriber station exiting a coverage area, and an expiration of a timer while the subscriber station is outside the coverage area of a wireless communications system.

40. The method of claim 39 wherein the network events comprises failed handoff conditions.

41. The method of claim 40 further comprising deriving data from the database comprising a map of failed handoff areas, and association data associating with each area one or more base stations.

42. The method of claim 41 further comprising, upon a subscriber station roaming into a failed handoff area, forcing or having forced a base station associated with the failed handoff area onto one or more of lists applicable to the subscriber station for supporting handoffs.

43. The method of claim 41 further comprising, upon a subscriber station roaming into a failed handoff area, adjusting or having adjusted one or more thresholds applicable to the subscriber station for supporting handoffs.

44. The method of claim 41 further comprising, upon a subscriber station roaming into a failed handoff area, adjusting or having adjusted one or more search times applicable to the subscriber station for supporting handoffs.

45. The method of claim 39 wherein the one or more triggering events comprises roaming into, out of, or within coverage gaps.

46. The method of claim 45 further comprising deriving data from the database representing a map of coverage gaps.

47. The method of claim 45 further comprising deriving data from the database representing one or more gradient maps.

48. The method of claim 46 further comprising using the data for a network planning or optimization application.

49. The method of claim 47 further comprising using the data for a network planning or optimization application, or for validating an RF propagation model.

50. A method of obtaining data useful for one or more wireless network applications comprising performing the following steps:
a step for forming records associating, for each of a plurality of subscriber stations, a position estimate for the subscriber station obtained, responsive to detecting an occurrence of a network event, with at least one of an identifier of the network event and data, measured or obtained, responsive to the position estimate;
a step for storing the records in a database responsive to the step for forming the records; and
a step for performing one or more network planning, optimization, validation or operations applications using data derived from the database;
wherein the network event includes at least one of the subscriber station entering the coverage area, the subscriber station exiting the coverage area, and an expiration of a timer while the subscriber station is outside the coverage area of the wireless communications system.

* * * * *